Figure 1:
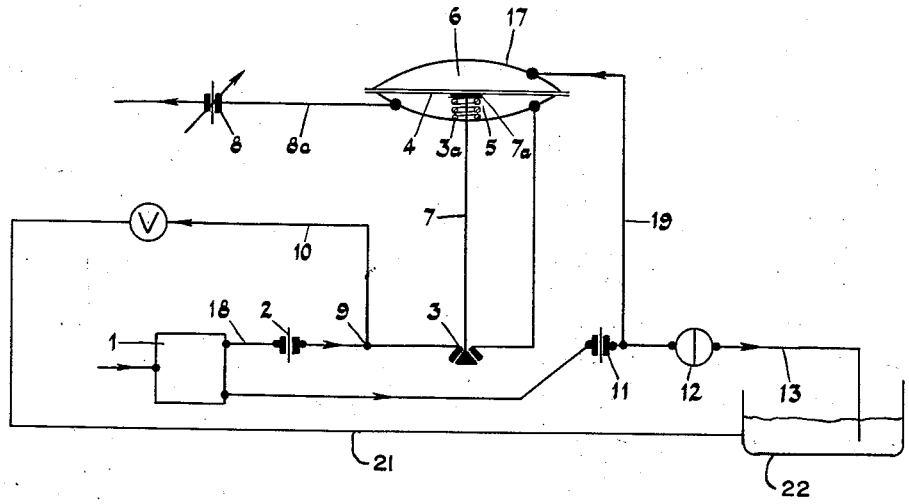

Sept. 24, 1963  R. COLE  3,104,678

LIQUID LEVEL CONTROLLING DEVICE

Filed Oct. 5, 1962

INVENTOR
RICHARD COLE
By
Cushman, Darby & Cushman
ATTORNEYS

United States Patent Office 3,104,678
Patented Sept. 24, 1963

3,104,678
LIQUID LEVEL CONTROLLING DEVICE
Richard Cole, West Hartlepool, England, assignor to Imperial Chemical Industries Limited, London, England, a corporation of Great Britain
Filed Oct. 5, 1962, Ser. No. 228,525
Claims priority, application Great Britain July 29, 1959
6 Claims. (Cl. 137—403)

This application is a continuation-in-part of our co-pending application Serial No. 43,170, filed July 15, 1960, now abandoned.

This invention relates to fluid controlling apparatus which may be used for controlling liquid levels in tanks or other containers, and particularly to apparatus in which back pressures exerted upon a column of gas, for example air, in a dip-pipe proportionally generates a pneumatic signal used to actuate a liquid supply control valve.

Control of liquid levels in tanks is an important feature of plant operation in the chemical industry and, hitherto, it has often been necessary to use in combination a dip-pipe, a device to maintain a constant air flow to the dip-pipe irrespective of the pressure of the air supply or the back pressure from the dip-pipe, a differential pressure sensing device, a recorder and pneumatic controller and a control valve.

Such an apparatus as outlined above is expensive and the present invention provides a relatively inexpensive apparatus including a pneumatic control means of adjustable sensitivity and a liquid supply control valve.

According to the present invention a fluid controlling apparatus comprises a liquid supply control valve, pneumatic control means for regulating the operation of said control valve including inlet means for compressed air, a nozzle restrictor in communication with said inlet means and a pilot valve having an adjustable leak in communication with said restrictor, means for biasing said pilot valve towards the closed position, said control means including a diaphragm defining a first and second chamber, means mechanically connecting said diaphragm to said pilot valve, a first gas line connecting said pilot valve leak to said first chamber, a second gas line operatively connected to said first chamber in communication with the atmosphere, an adjustable feed back restrictor in said last-mentioned line, fluid pressure sensing means, a third gas line connecting said fluid pressure sensing means to the second chamber of said pneumatic control means, and a fourth gas line connected to said first gas line between said nozzle restrictor and said pilot valve and to said supply control valve whereby fluctuating gas pressures in said second chamber caused by fluid pressure sensing means moves said diaphragm and regulates said pilot valve thereby regulating the pressure in said fourth gas line and said control valve.

Preferably the apparatus includes a fifth gas line in parallel with the said first gas line and connecting the said inlet means with the said fluid pressure sensing means, a restrictor in the said fifth gas line disposed between the said inlet means and the said fluid pressure sensing means and a dip-pipe in communication with the said fluid sensing means.

A fluid controlling apparatus having a pneumatic control means including a single diaphragm is particularly applicable to instances where it is required to maintain a constant liquid level of a predetermined value. The liquid level in a tank is governed by the depth of the open end of the dip-pipe below the liquid surface and, if at any time a different liquid level is required, it is necessary to raise or lower the open end of the dip-pipe accordingly. Such a procedure may be convenient in some instances but inconvenient in others.

In instances where it is inconvenient to provide for such adjustment of the dip-pipe in the tank an equivalent effect can be produced by means of a modified form of the invention in which the pneumatic control means includes a second diaphragm spaced from and having a different effective area than said first diaphragm, said first chamber defined by said first diaphragm and said second chamber defined by said second diaphragm, the space between the said two diaphragms defining a third chamber and an air supply pipe connected to the said third chamber.

Preferably the two diaphragms are arranged to be parallel with one another with a direct mechanical coupling therebetween.

Conveniently, in both forms of apparatus described above the sensitivity of the pneumatic control means is regulated by the adjustable restrictor disposed in the second gas line and communicating between the first chamber and atmosphere.

Figure 2:
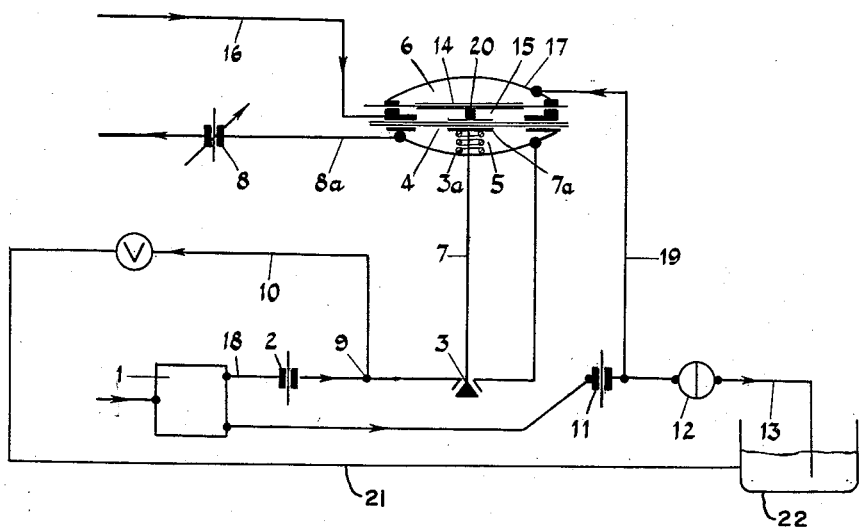

Two forms of fluid controlling apparatus in accordance with the invention will now be described, by way of example, with reference to the accompanying drawings, in which:

FIGURE 1 shows an apparatus employing a pneumatic control means having a single diaphragm, and
FIGURE 2 shows a modified apparatus employing a pneumatic control means having a double diaphragm.

Referring to FIGURE 1, air from a convenient source is fed under pressure to an air inlet 1 from which it is piped in parallel gas lines to a dip-pipe 13 extending downwardly and opening below the surface of the liquid contained in a tank 22, supply pipe 21 and a liquid supply control valve V respectively. The major portion of air leaving the air inlet 1 is conveyed to the liquid supply control valve V through a pipe 18, which forms part of a first gas line, a nozzle restrictor 2 and via a junction 9 into pipe 10 which forms a fourth gas line. The remainder of the air in the first gas line is fed through a pilot valve 3 into one chamber, designated 5, of a pneumatic control means 17 having two chambers separated by diaphragm 4.

Air leaving the air inlet 1 is also conveyed to the dip-pipe through a fifth gas line via a restrictor 11 and a bubble chamber 12. At a position intermediate between the restrictor 11 and the bubble chamber 12 a quantity of air is diverted through pipe 19 which forms a third gas line into chamber 6 of the pneumatic control means 17. The pilot valve 3 is mechanically connected to diaphragm 4 of the pneumatic control unit by a rod 7 so that displacement of the diaphragm 4 regulates the quantity of air passing through the pilot valve into the chamber 5. The pilot valve is biased towards the closed position by a spring 3a which bears against a disc 7a on the diaphragm 4.

In operation, variations of pressure in the dip-pipe 3 are communicated to chamber 6 displacing the diaphragm 4 and so opening or closing the pilot valve 3, thus lowering or raising the air pressure at junction 9 and in pipe-line 10 thereby actuating the liquid supply control valve V. Chamber 5 of the pneumatic control means 17 is open to atmosphere through a second gas line 8a and an adjustable feed back restrictor 8. The pressure drop across the adjustable feed back restrictor 8 provides a controlled back pressure in chamber 5 which governs displacement of the diaphragm 4 and consequently adjustment of the pilot valve 3. By adjusting the feed back restrictor 8 the sensitivity of the control unit can be set as required.

The pneumatic control means is reverse acting, that is, it gives an increased pressure at the junction 9 for a falling liquid level at the dip-pipe. In practice, a sensitivity as high as 2.5 inches water gauge to give an output pressure of 3 to 15 pounds per square inch may be achieved; a convenient sensitivity is about 5 inches water gauge for the same output pressure.

The pneumatic control means 17 having a single diaphragm described with reference to FIGURE 1 is particularly applicable to instances where it is required to maintain a constant liquid level of a predetermined value. The liquid level in tank 22 is governed by the depth of the open end of the dip-pipe 13 and if at any time a different liquid level is required, it is necessary to raise or lower the open end of the dip-pipe accordingly. Such a procedure may be convenient in some instances, but if frequent adjustment is necessary this procedure is clumsy and requires the fitting of lengthy flexible connections.

FIGURE 2 illustrates a modified pneumatic control means employing two diaphragms which enables any desired liquid level to be maintained without changing the position of the dip-pipe. In the modified pneumatic control means a second diaphragm 14 having a different effective area from diaphragm 4, is rigidly attached coaxially to diaphragm 4 by a connecting rod 20. The provision of two diaphragms 4 and 14 affords three chambers 5, 6 and 15, 5 and 6 being connected in the apparatus and fulfilling the same functions as those already described with reference to FIGURE 1. Chamber 15 however, bounded by diaphragms 4 and 14 is connected with an air supply through pipe 16 the pressure of which can be adjusted to any desired value. In such a modified control unit the resultant force exerted by the double diaphragm on pilot valve 3 is proportional to the ratio of the effective areas of the two diaphragms and it is arranged, as may be seen in FIGURE 2, to act in opposition to the pressure in the dip-pipe 13 and it thus provides the required adjustment of the pilot valve which in turn regulates the liquid supply control valve V.

The ratio between the effective areas of the diaphragms is conveniently arranged so that the control unit is in balance when the numerical value in pounds per square inch of the pressure applied to the space between the diaphragms is equal to the pressure in the dip-pipe in feet water gauge. This permits direct reading of levels in feet depth on a pressure gauge graduated in pounds per square inch. Other units of pressure can of course be chosen and corrections can be made for the different densities of the various liquids whose level is to be controlled.

What is claimed is:

1. Fluid controlling apparatus comprising a liquid supply control valve, pneumatic control means for regulating the operation of said control valve including inlet means for compressed air, a nozzle restrictor in communication with said inlet means and a pilot valve having an adjustable leak in communication with said restrictor, means for biasing said pilot valve towards the closed position, said control means including a diaphragm defining a first and second chamber, means mechanically connecting said diaphragm to said pilot valve, a first gas line connecting said pilot valve leak to said first chamber, a second gas line operatively connected to said first chamber in communication with the atmosphere, an adjustable feed back restrictor in said last-mentioned line, fluid pressure sensing means, a third gas line connecting said fluid pressure sensing means to the second chamber of said pneumatic control means, and a fourth gas line connected to said first gas line between said nozzle restrictor and said pilot valve and to said supply control valve whereby fluctuating gas pressures in said second chamber caused by fluid pressure sensing means moves said diaphragm and regulates said pilot valve thereby regulating the pressure in said fourth gas line and said control valve.

2. Apparatus according to claim 1 including a fifth gas line in parallel with the said first gas line and connecting the said inlet means with the said fluid pressure sensing means, a restrictor in the said fifth gas line disposed between the said inlet means and the said fluid pressure sensing means and a dip-pipe in communication with the said fluid sensing means.

3. Apparatus according to claim 2 in which the fluid pressure sensing means is a bubble chamber.

4. Apparatus according to claim 1 including a second diaphragm spaced from and having a different effective area than said first diaphragm, said first chamber defined by said first diaphragm and said second chamber defined by said second diaphragm, the space between the said two diaphragms defining a third chamber and an air supply pipe connected to the said third chamber.

5. Apparatus according to claim 4 including a fifth gas line in parallel with the said gas line and connecting the said inlet means with the said fluid pressure sensing means, a restrictor in the said fifth gas line disposed between the said inlet means and the said fluid pressure sensing means and a dip-pipe in communication with the said fluid sensing means.

6. Apparatus according to claim 5 in which the fluid pressure sensing means is a bubble chamber.

References Cited in the file of this patent
UNITED STATES PATENTS

| | | |
|---|---|---|
| 2,082,940 | Brisbane et al. | June 8, 1937 |
| 2,339,469 | Emanuel | Jan. 18, 1944 |
| 2,833,411 | Bosman et al. | May 6, 1958 |
| 2,851,564 | Zimmerman | Sept. 9, 1958 |
| 2,988,099 | Langhans | June 13, 1961 |